United States Patent Office 3,597,431
Patented Aug. 3, 1971

3,597,431
1-(4'-SUBSTITUTED-PHENYL)-2-(PHENYL LOWER ALKYL)-1,2,3,4-TETRAHYDROISOQUINOLINES
John Anthony Coppola, Suffern, N.Y., Rolf Paul, River Vale, N.J., and Elliott Cohen, Pearl River, N.Y., assignors to American Cyanamid Company, Stamford, Conn.
No Drawing. Continuation-in-part of application Ser. No. 758,588, Sept. 9, 1968. This application July 23, 1969, Ser. No. 844,157
Int. Cl. C07d 35/10
U.S. Cl. 260—288                                          10 Claims

ABSTRACT OF THE DISCLOSURE

This disclosure describes compounds of the class of substituted 1-phenyl-1,2,3,4-tetrahydroisoquinolines useful as antifertility and hypocholesteremic agents.

CROSS REFERENCE TO RELATED APPLICATION

This application is a continuation-in-part of our co-pending application Ser. No. 758,588, filed Sept. 9, 1968, now abandoned.

BRIEF SUMMARY OF THE INVENTION

This invention relates to new organic compounds and, more particularly, is concerned with novel substituted 1 - phenyl-1,2,3,4-tetrahydroisoquinolines which may be represented by the following structural formula:

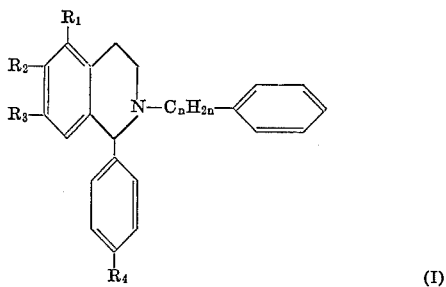

wherein $n$ is the whole number 2, 3 or 4; $R_1$, $R_2$ and $R_3$ are each individually selected from the group consisting of hydrogen, hydroxy, nitro, lower alkyl and lower alkoxy with the proviso that at least one of $R_1$, $R_2$ and $R_3$ must be hydrogen; and $R_4$ is selected from the group consisting of hydrogen, halogen, hydroxy, lower alkoxy, pyrrolidinoethoxy, diethylaminoethoxy, piperidinoethoxy and morpholinoethoxy. Suitable phenyl lower alkyl groups $$(C_6H_5—C_nH_{2n}—)$$

contemplated by the present invention are, for example, phenethyl, 1-phenylethyl, 3-phenylpropyl, 2-phenylpropyl, 1-benzylethyl, 4-phenylbutyl, 3-phenylbutyl, 1-phenethylethyl, 2-benzylpropyl, and the like. Suitable lower alkyl and lower alkoxy groups contemplated by the present invention are those having up to four carbon atoms such as, for example, methyl, ethyl, n-propyl, isobutyl, methoxy, ethoxy, isopropoxy, tert.-butoxy, etc. Halogen is exemplified by fluoro, chloro and bromo. Typical compounds of the present invention represented by the above general formula are, for example, 1-(p-pyrrolidinoethoxyphenyl)2-phenethyl-5-methyl-1,2,3,4-tetrahydroisoquinoline,
1-(p-fluorophenyl)-2-(4'-phenylbutyl)-5-nitro-1,2,3,4-tetrahydroisoquinoline,
1-(p-hydroxyphenyl)-2-(1'-phenylethyl)-5-ethoxy-1,2,3,4-tetrahydroisoquinoline,
1-(p-ethoxyphenyl)-2-(1'-benzylethyl)-5-isopropyl-1,2,3,4,-tetrahydroisoquinoline,
1-(p-piperidinoethoxyphenyl)-2-(2'-phenylpropyl)-6-methyl-1,2,3,4-tetrahydroisoquinoline,
1-(p-hydroxyphenyl)-2-(2'-benzylpropyl)-5,6-diethyl-1,2,3,4-tetrahydroisoquinoline,
1-(p-isopropoxyphenyl)-2-phenethyl-6-n-propoxy-1,2,3,4-tetrahydroisoquinoline,
1-(p-hydroxyphenyl)-2-(2'-benzylpropyl)-6-iso-butyl-1,2,3,4-tetrahydroisoquinoline,
1-(p-diethylaminoethoxyphenyl)-2-(3'-phenylpropyl)-7-ethyl-1,2,3,4-tetrahydroisoquinoline,
1-(p-bromophenyl)-2-(1'-benzylethyl)-7-isopropoxy-1,2,3,4-tetrahydroisoquinoline,
1-(p-n-propoxyphenyl)-2-(4'-phenylbutyl)-5,6-dihydroxy-1,2,3,4-tetrahydroisoquinoline,
1-(p-methoxyphenyl)-2-phenethyl-5,6-dinitro-1,2,3,4-tetrahydroisoquinoline,
1-(p-pyrrolidinoethoxyphenyl)-2-(3'-phenylbutyl)-5,6-diethoxy-1,2,3,4-tetrahydroisoquinoline,
1-(p-hydroxyphenyl)-2-(2'-benzylpropyl)-5,6-diethyl-1,2,3,4-tetrahydroisoquinoline,
1-(p-n-butoxyphenyl)-2-phenethyl-6,7-dinitro,1,2,3,4-tetrahydroisoquinoline,
1-(p-ethoxyphenyl)-2-(1'-phenylethyl)-6,7-dimethyl-1,2,3,4-tetrahydroisoquinoline,
1-(p-piperidinoethoxyphenyl)-2-(2'-phenylbutyl)-5,7-dihydroxy-1,2,3,4-tetrahydroisoquinoline,
1-(p-fluorophenyl)-2-phenethyl-5,7-dinitro-1,2,3,4-tetrahydroisoquinoline,
1-(p-pyrrolidinoethoxyphenyl)-2-(3'-phenylpropyl)-5,7-dimethoxy-1,2,3,4-tetrahydroisoquinoline,
1-(p-methoxyphenyl)-2-(3'-phenylbutyl)-5,7-diisopropyl-1,2,3,4-tetrahydroisoquinoline,
1-(p-chlorophenyl)-2-phenethyl-5-hydroxy-7-nitro-1,2,3,4-tetrahydroisoquinoline,
1-(p-diethylaminoethoxyphenyl)-2-(2'-phenylpropyl)-6-hydroxy-7-ethyl-1,2,3,4-tetrahydroisoquinoline,
1-(p-bromophenyl)-2-(1'-benzylethyl)-5-nitro-6-methoxy-1,2,3,4-tetrahydroisoquinoline,
1-(p-morpholinoethoxyphenyl)-2-phenethyl-6-hydroxy-7-ethoxy-1,2,3,4-tetrahydroisoquinoline,
1-(p-ethoxyphenyl)-2-(2'-benzylpropyl)-5-n-butyl-6-isopropoxy-1,2,3,4-tetrahydroisoquinoline, and
1-(p-hydroxyphenyl)-2-(2'-phenylbutyl)-5-n-propyl-7-nitro-1,2,3,4-tetrahydroisoquinoline.

DETAILED DESCRIPTION OF THE INVENTION

The novel compounds of the present invention form useful non-toxic pharmaceutically acceptable acid-addition salts with a variety of organic and inorganic salt-forming reagents. Thus, acid-addition salts, formed by admixture of the organic free base with an acid in a suitable solvent, are formed with such acids as sulfuric, phosphoric, hydrochloric, hydrobromic, sulfamic, citric, lactic, malic, succinic, tartaric, acetic, benzoic, gluconic, ascorbic, and related acids. Although the novel compounds of the present invention may be used as such, they are more preferably administered in the form of their non-toxic acid-addition salts. For purposes of this invention, the free bases are equivalent to their non-toxic acid-addition salts.

The novel compounds of the present invention are generally obtainable as white to yellow crystalline materials having characteristic melting points and absorption spectra and which may be purified by recrystallization from common organic solvents. They are appreciably soluble in many organic solvents such as methanol, ethanol, acetone, chloroform, and the like but are relatively insoluble in water. The acid-addition salts of the organic free bases of this invention are, in general, crystalline solids relatively soluble in water, methanol and ethanol but relatively insoluble in non-polar organic solvents such as diethyl ether, benzene, toluene, and the like.

The novel compounds of the present invention may be readily prepared by reacting an appropriately substituted 1-phenyl-1,2,3,4-tetrahydroisoquinoline of the following general formula:

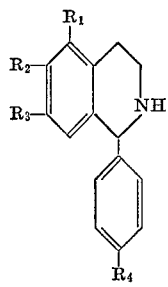

(II)

wherein $R_1$, $R_2$, $R_3$ and $R_4$ are as hereinabove defined, with a phenylalkyl halide of the formula:

$$C_6H_5-C_nH_{2n}-X$$

wherein $C_6H_5-C_nH_{2n}-$ is as hereinabove defined and X is chloro or bromo. This reaction is best carried out in ethanol as solvent at the reflux temperature for a period of time of from about 8 hours to about 15 hours or more and in the presence of an acid-acceptor such as sodium bicarbonate or soda ash. The products (I) may be isolated by drowning the reaction mixture in water, extracting with diethyl ether, and concentrating the ether extract.

Certain of the novel compounds of the present invention may also be readily prepared by reacting an appropriately substituted 1-phenyl-1,2,3,4-tetrahydroisoquinoline of the general Formula II with an acyl halide of the formula:

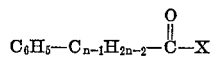

$$C_6H_5-C_{n-1}H_{2n-2}-\overset{O}{\underset{\|}{C}}-X$$

wherein $n$ is as hereinabove defined and X is chloro or bromo. This reaction is best carried out in chloroform solution using sodium hydroxide under the usual conditions of the Schotten-Baumann reaction. The amide so produced is isolated by separating the organic layer and washing with acidic and basic reagents. After drying, the organic layer is evaporated to dryness, the residue is taken up in tetrahydrofuran and reduced to the desired product (I) with borane (BH₃) in tetrahydrofuran. The usual conditions for the reduction are one hour at the reflux temperature, and isolation of the cooled product as the hydrochloride salt.

The substituted 1-phenyl-1,2,3,4-tetrahydroisoquinoline intermediates (II) may be readily prepared from an appropriately substituted phenethylamine (III) and an appropriately substituted benzoyl chloride (IV) as illustrated in the following reaction scheme:

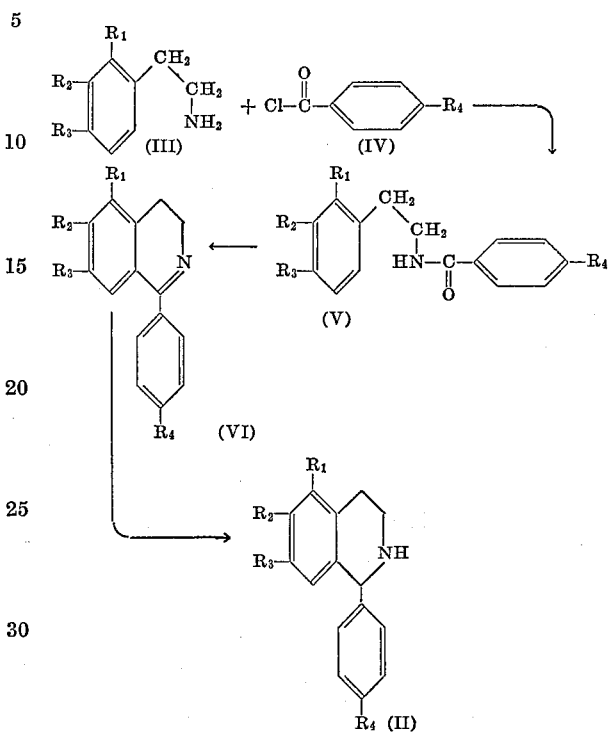

wherein $R_1$, $R_2$, $R_3$ and $R_4$ are as hereinabove defined. In accordance with the above reaction scheme, an appropriately substituted phenethylamine (III) is interacted with an appropriately substituted benzoyl chloride (IV) to provide the corresponding N-(phenethyl) benzamide (V). This reaction is best carried out in the presence of basic catalysts such as pyridine or aqueous sodium hydroxide. Cyclization of the N-(phenethyl) benzamide (V) with polyphosphoric acid, phosphorous trichloride, phosphorous pentoxide or a polyphosphate ester affords the corresponding 3,4-dihydroisoquinoline (VI). This reaction is best carried out at from about 120° C. to about 200° C. for a period of time of a few hours or more. Reduction of the 3,4-dihydroisoquinoline (VI) with sodium borohydride in methanol at room temperature for a period of time of about 12–15 hours affords the corresponding 1 - phenyl - 1,2,3,4 - tetrahydroisoquinoline (II).

The substituted 1 - phenyl - 1,2,3,4-tetrahydroisoquinoline intermediates (II) may also be readily prepared from an appropriately substituted phenethylamine (III) and an appropriately substituted benzaldehyde (VII) as illustrated in the following reaction scheme:

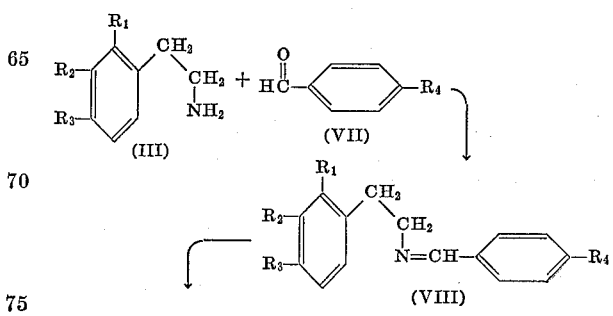

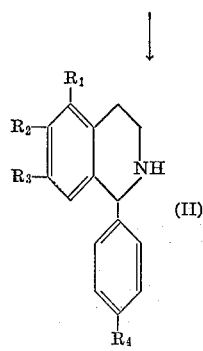

wherein $R_1$, $R_2$, $R_3$ and $R_4$ are as hereinabove defined. In accordance with the above reaction scheme, an appropriately substituted phenethylamine (III) is condensed with an appropriately substituted benzaldehyde (VII) to provide the corresponding Schiff base (VIII). This condensation is best carried out in refluxing benzene while removing water in a Dean-Stark trap from the reaction mixture. Cyclization of the Schiff base (VIII) with trifluoroacetic acid at the reflux temperature for about 5 hours or more affords the corresponding 1-phenyl-1,2,3,4-tetrahydroisoquinoline (II).

The novel compounds of the present invention are valuable antifertility agents of low toxicity and were shown to possess such activity as determined by animal experiments as follows. Adult Wistar strain rats, maintained on a standard laboratory diet of rat pellets and water, ad libitum, were used. Graded doses of the test compounds were administered orally, once daily for ten days, to female rats. The composition to be administered was made up of propylene glycol and an appropriate amount of the test compound, so that the desired dose was given by gavage, in a 0.5 ml. volume. Control rats were given propylene glycol without the test compound. On the afternoon of the fourth day of treatment, the females were placed with fertile males in a one to one ratio. Four days after the last administration of test compound, the females were sacrificed and their pregnancy verified by autopsy. In a representative operation, and merely by way of illustration, the antifertility efficacy of typical compounds of this invention are set forth in Table I below:

TABLE I

| Compound | Dose [1] | Number of rats pregnant/ number of rats treated |
|---|---|---|
| dl-1-phenyl-2-(3'-phenylpropyl)-1,2,3,4-tetrahydroisoquinoline hydrochloride | 0<br>1.0<br>2.0<br>4.0<br>8.0<br>16.0 | 8/8<br>4/4<br>4/4<br>3/4<br>0/4<br>0/4 |
| dl-1-phenyl-2-phenethyl-1,2,3,4-tetrahydroisoquinoline hydrochloride | 0.5<br>1.0<br>2.0<br>3.0 | 4/4<br>4/6<br>5/8<br>0/8 |
| l-1-phenyl-2-phenethyl-1,2,3,4-tetrahydroisoquinoline hydrochloride | 0.5<br>1.0<br>2.0<br>3.0 | 7/8<br>3/8<br>0/7<br>0/8 |
| dl-1-phenyl-2-phenethyl-6,7-dihydroxy-1,2,3,4-tetrahydroisoquinoline hydrochloride | 2.0<br>4.0<br>8.0<br>16.0<br>25.0 | 4/4<br>4/4<br>1/2<br>4/4<br>0/4 |
| dl-1-phenyl-2-phenethyl-7-methoxy-1,2,3,4-tetrahydroisoquinoline hydrochloride | 1.0<br>2.0<br>5.0 | 4/4<br>2/4<br>1/4 |
| dl-1-(p-chlorophenyl)-2-phenethyl-1,2,3,4-tetrahydroisoquinoline hydrochloride | 10.0<br>2.0<br>5.0<br>10.0 | 0/4<br>4/4<br>1/3<br>0/2 |
| dl-1-phenyl-2-phenethyl-6-methoxy-1,2,3,4-tetrahydroisoquinoline hydrochloride | 0.5<br>1.0<br>2.0 | 2/4<br>0/3<br>0/4 |
| dl-1-phenyl-2-phenethyl-7-nitro-1,2,3,4-tetrahydroisoquinoline hydrochloride | 5.0<br>5.0<br>10.0<br>20.0 | 0/3<br>4/4<br>2/3<br>1/3 |
| dl-1-phenyl-2-phenethyl-5-methoxy-1,2,3,4-tetrahydroisoquinoline hydrochloride | 0.1<br>0.2<br>0.4<br>0.8<br>1.0<br>2.0 | 4/4<br>2/3<br>2/4<br>1/4<br>0/3<br>0/4 |
| dl-1-phenyl-2-phenethyl-7-methyl-1,2,3,4-tetrahydroisoquinoline hydrochloride | 1.0<br>5.0<br>10<br>20 | 4/6<br>4/7<br>5/6<br>0/4 |
| dl-1-phenyl-2-phenethyl-6-hydroxy-1,2,3,4-tetrahydroisoquinoline hydrochloride | 20 | 0/4 |
| dl-1-phenyl-2-phenethyl-5-hydroxy-1,2,3,4-tetrahydroisoquinoline hydrochloride | 20 | 0/4 |
| dl-1-(p-methoxyphenyl)-2-phenethyl-1,2,3,4-tetrahydroisoquinoline hydrochloride | 1.0<br>5.0<br>10<br>20 | 5/5<br>4/7<br>5/6<br>0/4 |
| dl,dl-1-phenyl-2-(2'-phenylpropyl)-1,2,3,4-tetrahydroisoquinoline hydrochloride | 0.05<br>0.1<br>0.2 | 7/8<br>7/8<br>3/7 |
| dl,dl,-1-phenyl-2-(2'-phenylbutyl)-1,2,3,4-tetrahydroisoquinoline hydrochloride | 0.5<br>0.25<br>0.5<br>1.0 | 0/8<br>2/7<br>1/41<br>0/15 |
| dl-1-phenyl-2-phenethyl-6,7-dimethoxy-1,2,3,4-tetrahydroisoquinoline hydrochloride | 1<br>5<br>10<br>20 | 3/4<br>4/4<br>1/4<br>1/8 |
| dl-1-(p-chlorophenyl)-2-phenethyl-6-methoxy-1,2,3,4-tetrahydroisoquinoline hydrochloride | 1.0<br>5.0<br>10.0 | 3/5<br>0/7<br>0/8 |
| dl-1-(p-pyrrolidinoethoxyphenyl)-2-phenethyl-6-methoxy-1,2,3,4-tetrahydroisoquinoline dihydrobromide | 20.0<br>0.25<br>0.5<br>1.0<br>5.0 | 0/14<br>3/5<br>7/15<br>0/15<br>0/8 |

[1] Dose=mg./kg. of body weight/day.

The compound dl-1-phenyl-2-phenethyl-1,2,,4-tetrahydroisoquinoline was found to be highly active as an antifertility agent. We have also found that the levo-form contains substantially all of the antifertility activity. Furthermore, the levo-form enables preparation of a product of high antifertility activity and thus increases the therapeutic range of the product. The levo-form of 1-phenyl-2-phenetyhl-1,2,3,4-tetrahydroisoquinoline is ordinarily used in the form of water-soluble salts, derived from inorganic or organic acids, and anions of which are non-toxic and otherwise inocuous at the dosage levels required for therapeutic results. Salts which are useful can be obtained, for example, by reacting the enantiomorph with hydrochlorc acid, hydrobromic acid, sulfuric acid, citric acid, tartaric acid, and the like.

Additionally, the novel compounds of the present invention are active hypocholesteremic agents when tested for serum cholesterol lowering in rats as follows. The diet used in the test is made from a commercial feed designed for small laboratory animals and sold by the Ralston Purina Company, St. Louis, Mo. under the trademark Purina Laboratory Chow®. This commercial feed is sold in the form of pressed pellets. For this test the pellets were ground into a homogeneous mixture for administration to control rats. For test rats the pellets were ground and the appropriate amount of test compound was added as a solution in a volatile solvent. While mixing, the mixture was dried in the air to remove the solvent, thereby giving a homogeneous diet plus test compound. Each test compound was administered to individual groups of male rats, CFE strain from Carworth Farms. A control group of eight rats was maintained on the diet alone, test groups being maintained on the diet plus 0.05% (75 mg./kg. of body weight) of the test compound. After six days the animals were sacrificed and serum cholesterol concentrations in mg./100 ml. were determined either (1) according to the saponification and extraction method of Trinder, Analyst 77, 321 (1952) and the colorimetric determination of Zlatkis et al., J. Lab. Clin. Med. 41, 486 (1953) or (2) by the extracting method of Leffler, Amer. J. Clin. Path. 31, 310 (1959) and the colorimetric determination of Zlatkis et al. (vide supra); the overall method being appropriately modified for use with an automatic mechanical analyzer. In this test, a compound is considered to have hypocholesteremic activity if it depresses serum cholesterol 20% or more below that of the controls. In a representative operation, and merely by way of illustration, the hypocholesteremic activity of typical compounds of this invention are set forth in Table II below:

TABLE II

| Compound | Dose [1] | Percent reduction of serum cholesterol below controls |
|---|---|---|
| dl-1-phenyl-2-phenethyl-5-methoxy-1,2,3,4-tetrahydroisoquinoline hydrochloride | 0.05 | 64 |
| dl-1-phenyl-2-phenethyl-7-nitro-1,2,3,4-tetrahydroisoquinoline hydrochloride | 0.05 | 39 |
| dl-1-phenyl-2-phenethyl-6-methoxy-1,2,3,4-tetrahydroisoquinoline hydrochloride | 0.03 | 44 |
|  | 0.01 | 49 |
|  | 0.05 | 70 |
| dl-1-(p-chlorophenyl)-2-phenethyl-1,2,3,4-tetrahydroisoquinoline hydrochloride | 0.03 | 24 |
|  | 0.05 | 45 |
| dl-1-phenyl-2-phenethyl-7-methoxy-1,2,3,4-tetrahydroisoquinoline hydrochloride | 0.01 | 43 |
|  | 0.05 | 68 |
| l-1-phenyl-2-phenethyl-1,2,3,4-tetrahydroisoquinoline hydrochloride | 0.01 | 48 |
|  | 0.05 | 61 |
| dl-1-phenyl-2-(3'-phenylpropyl)-1,2,3,4-tetrahydroisoquinoline hydrochloride | 0.05 | 35 |
| dl-1-phenyl-2-phenethyl-1,2,3,4-tetrahydroisoquinoline hydrochloride | 0.05 | 67 |
| dl-1-phenyl-2-phenethyl-7-methyl-1,2,3,4-tetrahydroisoquinoline hydrochloride | 0.1 | 66 |
| dl,dl-1-phenyl-2-(2'-phenylpropyl)-1,2,3,4-tetrahydroisoquinoline hydrochloride | .05 | 60 |
| dl,dl-1-phenyl-2-(2'-phenylbutyl)-1,2,3,4-tetrahydroisoquinoline hydrochloride | 0.1 | 58 |
| dl-1-(p-hydroxyphenyl)-2-phenethyl-6-methoxy-1,2,3,4-tetrahydroisoquinoline hydrochloride | 0.1 | 56 |

[1] Dose=weight percent in the diet.

The invention will be described in greater detail in conjunction with the following specific examples.

EXAMPLE 1

Preparation of dl-1-phenyl-2-phenethyl-1,2,3,4-tetrahydroisoquinoline hydrochloride A mixture of 27 grams (0.11 mole) of dl-1-phenyl-1,2,3,4-tetrahydroisoquinoline hydrochloride, 20.4 grams (0.11 mole) of phenethyl bromide, 400 milliliters of ethanol and 42 grams (0.5 mole) of sodium bicarbonate was heated under reflux for 8 hours. It was then poured into 1 liter of water and extracted with ether. The ether was dried (Drierite) and gaseous hydrogen chloride added until a blue color was obtained on Congo red paper. This precipitated 24.8 grams (64.5%) of dl-1-phenyl- 2 - phenethyl - 1,2,4,4 - tetrahydroisoquinoline hydrochloride, a white solid that was further purified by recrystallization from water, M.P. 214–217° C.

EXAMPLE 2

Preparation of l-1-phenyl-2-phenethyl-1,2,3,4-tetrahydroisoquinoline hydrochloride l-1-phenyl - 1,2,3,4 - tetrahydroisoquinolinium-d-tartrate [W. Leithe, Monatsh. Chem. 53–54, 956 (1929)] (6.00 grams, 0.0167 mole) was added to 80 milliliters of water and 20 milliliters of concentrated ammonia and extracted three times with ether. The combined organic extracts were dried (sodium sulfate) and concentrated under vacuum. The residual free base was refluxed with 50 milliliters of ethanol, 1.06 grams (0.010 mole) of sodium carbonate and 3.10 grams (0.0167 mole) of phenethyl bromide for 9½ hours. The reaction mixture was concentrated under vacuum and the residue distributed between ether and dilute aqueous sodium bicarbonate. The ether extract was dried (sodium sulfate) and concentrated under vacuum. The residue was chromatographed on silica gel eluting with carbon tetrachloride containing progressively more chloroform, then chloroform containing progressively more methanol. It was then separated into product-fast moving and recovered starting material-slow moving. The product was crystallized from ethanol-hydrogen chloride-ether, recrystallized from dilute hydrochloric acid and again from the first system to give 2.27 grams (39%) of l-1-phenyl-2-phenethyl - 1,2,3,4-tetrahydroisoquinoline hydrochloride, M.P. 210.5–218.5° C., $[\alpha]_D^{25}$ —134.5±1.2 (c. 2.6, ethanol).

EXAMPLE 3

Preparation of dl-1-phenyl-2-(3'-phenylpropyl)-1,2,3,4-tetrahydroisoquinoline hydrochloride Following the general procedure of Example 1, 1.23 grams (0.005 mole) of dl-1-phenyl-1,2,3,4-tetrahydroisoquinoline hydrochloride was reacted with 1.00 gram (0.005 mole) of 3-bromo-phenylpropane to give 0.95 gram (52%) of N-substituted tetrahydroisoquinoline M.P. 178–181° C.

EXAMPLE 4

Preparation of dl-1-phenyl-6-methoxy-1,2,3,4-tetrahydroisoquinoline hydrochloride The solution obtained from 6.04 grams (0.040 mole) of m-methoxyphenethylamine, 4.77 grams (0.045 mole) of benzaldehyde and 100 milliliters of benzene was refluxed until no more water collected in a Dean-Stark trap (1 hour). After concentrating it in vacuum, the residue was refluxed for 5 hours with 40 milliliters of trifluoroacetic acid. The black solution was poured into water, made alkaline with solid sodium carbonate and extracted three times with ether. The combined extracts were dried (sodium sulfate) then saturated with hydrogen chloride. A precipitate appeared which was collected and dried to give 11.6 grams of product M.P. 269–276° C. Upon recrystallization from methanol containing a little hydrogen chloride 8.98 grams (82%) of amine hydrochloride, M.P. 277–279° C. was obtained.

EXAMPLE 5

Preparation of dl-1-phenyl-2-phenethyl-6-methoxy-1,2,3,4-tetrahydroisoquinoline hydrochloride dl-1-phenyl-6-methoxy - 1,2,3,4 - tetrahydroisoquinoline (4.14 grams, 0.015 mole) was reacted with 2.78 grams (0.015 mole) of phenethyl bromide by the procedure of Example 2 to give on recrystallization 2.74 grams (48%) of tertiary amine hydrochloride, M.P. 239–244° C. d.

EXAMPLE 6

Preparation of dl-1-phenyl-6,7-dihydroxy-1,2,3,4-tetrahydroisoquinoline hydrochloride The reaction of 5.69 grams (0.030 mole) of hydroxytyramine hydrochloride and 3.50 grams (0.033 mole) of benzaldehyde was carried out by the process of Example 4. An 11% yield (0.95 grams) of product, M.P. 140–156° C. resolidified 240–246° C., was obtained.

EXAMPLE 7

Preparation of dl-1-phenyl-2-phenethyl-6,7-dihydroxy-1,2,3,4-tetrahydroisoquinoline hydrochloride By reacting 2.78 grams (0.010 mole) of dl-1-phenyl-6,7-dihydroxy - 1,2,3,4 - tetrahydroisoquinoline hydrochloride with 1.85 grams (0.010 mole) of phenethyl bromide by the method of Example 2, a 0.78 gram (20%) yield of product, M.P. 173–176° C., was obtained.

EXAMPLE 8

Preparation of dl-1-phenyl-7-methoxy-1,2,3,4-tetrahydroisoquinoline hydrochloride A mixture of 4.00 grams (0.0157 mole) of N-p-methoxyphenethylbenzamide and 29 grams of polyphosphate ester [Y. Kanaoka, M. Macbida, O. Yonemitsu and Y. Ban, Chem. Pharm. Bull. 13, 1065 (1965)] was stirred and heated to 120–130° C. for 1 hour. The hot mixture was poured into water. After washing the resulting solution with ethyl acetate, the aqueous phase was made strongly alkaline with sodium hydroxide and the intermediate extracted into benzene. The benzene layer was dried (sodium sulfate) and concentrated under vacuum. The crude residual 1-phenyl-7-methoxy-3,4-dihydroisoquinoline was dissolved in 60 milliliters of methanol and 1.5 grams (0.04 mole) of sodium borohydride was added. After standing overnight, the solution was concentrated under vacuum. The residue was diluted with water and extracted into ether. The either layer was dried (sodium sulfate) and saturated with hydrogen chloride to give a precipitate. This precipitate was collected and recrystallized from methanol-hydrogen chloride-ether to give 1.89 grams (44%) of 1-phenyl-7-methoxy-1,2,3,4-tetrahydroisoquinoline hydrochloride, M.P. 280–283° C.

EXAMPLE 9

Preparation of dl-1-phenyl-2-phenethyl-7-methoxy-1,2,3,4-tetrahydroisoquinoline hydrochloride The product was prepared from 3.62 grams (0.013 mole) of dl-1-phenyl-7-methoxy-1,2,3,4-tetrahydroisoquinoline hydrochloride and 2.78 grams (0.015 mole) of phenethyl bromide by the process of Example 2. A 51% yield (2.56 grams) of product, M.P. 217–220° C., was obtained.

EXAMPLE 10

Preparation of dl-1-phenyl-5-methoxy-1,2,3,4-tetrahydroisoquinoline hydrochloride From 17.07 grams (0.067 mole) of N-o-methoxyphenethyl benzamide, using essentially the method of Example 8, 3.72 grams (20%) of tetrahydroisoquinoline, M.P. 291.5–294.5° C. was obtained.

EXAMPLE 11

Preparation of dl-1-phenyl-2-phenethyl-5-methoxy-1,2,3,4-tetrahydroisoquinoline hydrochloride Following the general procedure of Example 2, 3.51 grams (0.0127 mole) of dl-1-phenyl-5-methoxy-1,2,3,4-tetrahydroisoquinoline hydrochloride and 2.36 grams (0.0127 mole) of phenethyl bromide were reacted to give 0.98 gram (20%) of product, M.P. 247.5–252° C. d.

EXAMPLE 12

Preparation of dl-1-(o-chlorophenyl)-1,2,3,4-tetrahydro isoquinoline hydrochloride A stirred mixture of 17.00 grams (0.0655 mole) of N-phenethyl-o-chlorobenzamide, 211 grams of commercial polyphosphoric acid and circa 5 grams of phosphorous pentoxide was heated for 3 hours at 204° C. The black mixture was poured onto ice and a little concentrated aqueous potassium hydroxide added to break up the precipitated oil. The still strongly acid solution was filtered to remove insoluble matter and the filtrate made strongly alkaline with potassium hydroxide. It was then extracted with benzene, the extract, dried over sodium sulfate and concentrated under vacuum. The residual crude 1-o-chlorophenyl-3,4-dihydroisoquinoline was dissolved in 180 milliliters of methanol, and 6.85 grams (0.18 mole) of sodium borohydride added. After standing at room temperature overnight, the solution was concentrated in vacuum, the residue diluted with water and extracted with ether. The organic extract was dried over sodium sulfate, then saturated with hydrogen chloride. The resulting precipitate was collected and recrystallized from ethanol-hydrogen chloride to give 12.47 grams (68%) of product, M.P. 246–248° C.

EXAMPLE 13

Preparation of dl-1-(o-chlorophenyl)-2-phenethyl-1,2,3,4-tetrahydroisoquinoline hydrochloride The reaction of 8.40 grams (0.030 mole) of dl-1-(o-chlorophenyl)-1,2,3,4-tetrahydroisoquinoline hydroquinoline hydrochloride with 5.55 grams (0.030 mole) of phenethyl bromide by the procedure of Example 2 provided 2.21 grams (267 of tertiary amine hydrochloride, M.P. 246–250° C.

EXAMPLE 14

Preparation of dl-1-(m-chlorophenyl)-1,2,3,4-tetrahydroisoquinoline hydrochloride Following the procedure of Example 12, 15.00 grams (0.0578 mole) of N-phenethyl-m-chlorobenzamide was converted to 15.50 grams (90%) of product, M.P. 127° C. foam, as the ¼ etherate.

EXAMPLE 15

Preparation of dl-1-(m-chlorophenyl)-2-phenethyl-1,2,3,4-tetrahydroisoquinoline hydrochloride Using the method of Example 2, 8.97 grams (0.030 mole) of dl-1-(m-chlorophenyl)-1,2,3,4-tetrahydroisoquinoline hydrochloride ¼ etherate was reacted with 5.55 grams (0.030 mole) of phenethyl bromide to give 6.06 grams (53%) of product, M.P. 240–255° C.

EXAMPLE 16

Preparation of dl-1-(p-chlorophenyl)-1,2,3,4-tetrahydroisoquinoline hydrochloride The method of Example 12 was used to convert 20.00 grams (0.072 mole) of N-phenethyl p-chlorobenzamide to 17.57 grams (88%) of amine hydrochloride, M.P. 233–236° C.

EXAMPLE 17

Preparation of dl-1-(p-chlorophenyl)-2-phenethyl-1,2,3,4-tetrahydroisoquinoline hydrochloride The reaction of 8.40 grams (0.030 mole) of dl-1-p-chlorophenyl-1,2,3,4-tetrahydroisoquinoline hydrochloride and 5.55 grams (0.030 mole) of phenethyl bromide was carried out by the method of Example 2 giving 2.95 grams (26%) of product M.P. 203–209° C.

EXAMPLE 18

Preparation of 1-phenyl-7-nitro-3,4-dihydroisoquinoline

After a solution of 20.7 grams (0.10 mole) of 1-phenyl-3,4-dihydroisoquinoline in 100 milliliters of concentrated nitric acid was cooled to 0° C., 200 milliliters of fuming nitric acid was slowly added. After standing overnight at room temperature, the solution was poured onto ice, then made alkaline with potassium hydroxide. A precipitate appeared, which was collected. The solid was suspended between 200 milliliters of chloroform and 60 milliliters of 17 N ammonia. The organic phase was concentrated to give a solid. Recrystallization from ethanol gave 10.60 grams (42%) of 1-phenyl-7-nitro-3,4-dihydroisoquinoline M.P. 148.5–152° C. A salt with nitric acid was prepared and recrystallized from methanol containing a little nitric acid, M.P. 173° C. d.

EXAMPLE 19

Preparation of dl-1-phenyl-7-nitro-1,2,3,4-tetrahydroisoquinoline hydrochloride

A solution of 10.31 grams (0.0411 mole) of 1-phenyl-7-nitro-3,4-dihydroisoquinoline was dissolved in 200 milliliters of methanol and 100 milliliters of tetrahydrofuran, and 3.0 grams (0.080 mole) of sodium borohydride added. After standing overnight the solution was concentrated, under vacuum, diluted with water and extracted with ether. The organic phase was dried (sodium sulfate) and saturated with hydrogen chloride. The resulting precipitate was collected and recrystallized from ethanol-methanol-hydrogen chloride to give 6.95 grams (58%) of product M.P. 250–255° C.

EXAMPLE 20

Preparation of dl-1-phenyl-2-phenethyl-7-nitro-1,2,3,4-tetrahydroisoquinoline hydrochloride By the process described in Example 2, 6.72 grams (0.0231 mole) of dl-1-phenyl-7-nitro-1,2,3,4-tetrahydroisoquinoline hydrochloride and 4.28 grams (0.0231 mole)

of phenethyl bromide were converted to 2.00 grams (22%) of product M.P. 225–228.5° C. d.

EXAMPLE 21

Preparation of dl-1-phenyl-2-(3'-phenylpropyl)-6-methoxy-1,2,3,4-tetrahydroisoquinoline hydrochloride dl - 1 - phenyl - 6 - methoxy - 1,2,3,4 - tetrahydroisoquinoline hydrochloride (3.72 g., 0.0135 mole) was reacted with 2.69 g. (0.0135 mole) of 1-bromo-3-phenylpropane by the procedure of Example 2 to give 4.08 g. (77%) of tertiary amine hydrochloride, M.P. 175–176° C.

EXAMPLE 22

Preparation of N-phenethyl-p-fluorobenzamide

A mixture of 7.26 g. (0.060 mole) of phenethylamine, 80 ml. of methylene chloride and 60 ml. of water was rapidly stirred in an ice bath. Then 9.53 g. (0.060 mole) of p-fluorobenzoyl chloride was added portionwise. After each portion, the pH was adjusted with N sodium hydroxide until phenolphthalein just turned pink. When the addition was completed, the organic layer was separated, dried (sodium sulfate) and permitted to evaporate to dryness. The residue crystallized and was recrystallized from ethanol to give 12.34 g. (85%) of product, M.P. 123–125° C.

EXAMPLE 23

Preparation of dl-1-(p-fluorophenyl)-1,2,3,4,-tetrahydroisoquinoline hydrochloride Using essentially the method of Example 12, 12.00 g. (0.0494 mole) of N-phenethyl-p-fluorobenzamide was converted to 10.45 g. (80%) of tetrahydroisoquinoline, M.P. 252–258° C.

EXAMPLE 24

Preparation of dl-1-(p-fluorophenyl)-2-phenethyl-1,2,3,4-tetrahydroisoquinoline hydrochloride The reaction of 5.13 g. (0.020 mole) of 1-(p-fluorophenyl) - 1,2,3,4 - tetrahydroisoquinoline hydrochloride with 3.70 g. (0.020 mole) of phenethyl bromide by the procedure of Example 2 gave 3.21 g. (43%) of product, M.P. 185–188.5° C.

EXAMPLE 25

Preparation of dl-1-phenyl-2-phenethyl-7-hydroxy-1,2,3,4-tetrahydroisoquinoline dl - 1 - phenyl - 2 - phenethyl - 7 - methoxy - 1,2,3,4-tetrahydroisoquinoline hydrochloride (0.41 g., 0.00108 mole) was refluxed with 4.1 ml. of 48% hydrobromic acid and 3 ml. of acetic acid for 3½ hours. The solution was alkalinized with sodium bicarbonate and extracted with ether-n-butanol, 1:1. After the organic extract had evaporated to dryness, the residue was crystallized from ethanol-hydrogen chloride-ether to give 0.38 g. (95%) of phenolic product M.P. 229–236° C. Recrystallization from ethanol gave 0.23 g. (57%) of material M.P. 236–247.5° C.

EXAMPLE 26

Preparation of dl-1-phenyl-2-(4'-phenylbutyl)-1,2,3,4-tetrahydroisoquinoline hydrochloride By applying steam heat to a solution of 6.56 g. (0.040 mole) of 4-phenylbutyric acid, 0.29 g. (0.004 mole) of dimethylformamide, 20 ml. of toluene and 2.90 ml. (4.75 g., 0.042 mole) of thionyl chloride for 30 minutes, the acid was converted to the acid chloride. A mixture of 9.84 g. (0.040 mole) of phenethylamine, 100 ml. of chloroform and 50 ml. of water was cooled in an ice bath and stirred as rapidly as possible. A drop of phenolphthalein indicator solution was added. Then the acid chloride solution, from above, was added portionwise, using N sodium hydroxide to just maintain a pink color. After the reaction was completed the organic phase was separated, washed with 1 N sodium hydroxide, then 1 N hydrochloric acid, dried (sodium sulfate) and evaporated to dryness. The crude 1 - phenyl - 2 - (4 - phenylbutyryl)-1,2,3,4-tetrahydroisoquinoline remained as an oil and was dissolved in 30 ml. of dry tetrahydrofuran. This solution was added to 100 ml. of an ice cold solution of 1 M borane in tetrahydrofuran. The reaction mixture was then heated under reflux for 3 hours, cooled to 0° C. and decomposed with 20 ml. of 6 N hydrochloric acid. After distilling off the bulk of the tetrahydrofuran, the residue was diluted with water and adjusted to pH 11 with sodium hydroxide. An oil came out that was extracted into ether and dried (sodium sulfate). The ethereal solution was saturated with hydrogen chloride to give an oil which crystallized on standing overnight at 0° C. Recrystallization from ethanol-hydrogen chloride gave 12.81 g. (85%) of dl - 1 - phenyl - 2 - (4' - phenylbutyl) - 1,2,3,4-tetrahydroisoquinoline hydrochloride, M.P. 207–209° C.

EXAMPLE 27

Preparation of dl,dl-1-phenyl-2-(2'-phenylpropyl)-1,2,3,4-tetrahydroisoquinoline hydrochloride The method described in Example 26 was used to convert 4.50 g. (0.030 mole) of dl-2-phenyl propionic acid and 7.36 g. (0.030 mole) of dl-1-phenyl-1,2,3,4-tetrahydroisoquinoline hydrochloride to give 6.37 g. (58%) of product, M.P. 206–217° C.

EXAMPLE 28

Prepartaion of dl-1-(p-bromophenyl)-1,2,3,4-tetrahydroisoquinoline hydrochloride The method of Example 12 was used to convert N-phenethyl-p-bromobenzamide to the amine hydrochloride.

EXAMPLE 29

Preparation of dl-1-(p-bromophenyl)-2-phenethyl-1,2,3,4-tetrahydroisoquinoline hydrochloride The reaction of dl - 1 - (p - bromophenyl) - 1,2,3,4-tetrahydroisoquinoline hydrochloride and phenethyl bromide was carried out by the method of Example 2 to yield the desired product.

EXAMPLE 30

Preparation of dl-1-phenyl-7-methyl-1,2,3,4-tetrahydroisoquinoline hydrochloride The method of Example 12 was used to convert 40.00 g. (0.167 mole) of N-p-tolylethylbenzamide [Pritzkow et al., J. Prakt. Chem. 29, 123 (1965)] to 30.98 g. (76%) of product, M.P. 259°–267° C.

EXAMPLE 31

Preparation of dl-1-phenyl-2-phenethyl-7-methyl-1,2,3,4-tetrahydroisoquinoline hydrochloride To a cooled, stirred mixture of 5.89 g. (0.022 mole) of 1 - phenyl - 7 - methyl - 1,2,3,4-tetrahydroisoquinoline hydrochloride, 80 ml. of chloroform, a few drops of phenolphthalein (tincture) and enough 1 N sodium hydroxide to just give a pink color, was added, portionwise, 3.56 g. (0.023 mole) of phenylacetyl chloride. After each portion, enough 1 N sodium hydroxide was added to maintain a pink color. Stirring was continued for one hour after the last portion had been added. The organic layer was separated and washed consecutively with 1 N sodium hydroxide, brine, 1 N hydrochloric acid and brine. Then it was dried over anhydrous sodium sulfate and permitted to evaporate to dryness. Next the residual crude oily amide was taken up in 50 ml. of tetrahydrofuran and added to 50 ml. of 1 N borane in tetrahydrofuran. After refluxing for one hour, the solution was cooled to 0° C. and 13 ml. of 6 N hydrochloric acid added. After boiling off the solvent, the residue was made alkaline with potassium hydroxide and the product extracted into ether. The ethereal solution was dried over sodium sulfate and excess hydrogen chloride bubbled in. A precipitate formed which was collected and recrystallized from 100 ml. of ethanol-ether (1:1) containing a little hydrogen chloride to give 6.46 g. (81%) of tertiary-amine hydrochloride, M.P. 221°–223° C.

EXAMPLE 32

Preparation of dl-1-phenyl-2-phenethyl-6-hydroxy-1,2,3,4-tetrahydroisoquinoline hydrochloride The method of Example 25 was used to convert 16.30 g. (0.0429 mole) of 1-phenyl-2-phenethyl-6-methoxy-1,2,3,4-tetrahydroisoquinoline hydrochloride to 12.70 g. (81%) of product M.P. 241–248.5° C.

EXAMPLE 33

Preparation of dl-1-phenyl-2-phenethyl-5-hydroxy-1,2,3,4-tetrahydroisoquinoline hydrochloride By applying the process of Example 25, 13.59 g. (0.0358 mole) of dl-1-phenyl-2-phenethyl-5-methoxy-1,2,3,4-tetrahydroisoquinoline hydrochloride was converted to 10.36 g. (79%) of phenolic product, M.P. 283°–290° C.

EXAMPLE 34

Preparation of N-phenethyl-p-methoxybenzamide

Using the method of Example 22, 12.1 g. (0.10 mole) of phenethylamine and 17.06 g. (0.10 mole) of anisoyl chloride were reacted to give 24.18 g. (95%) of amine, M.P. 116°–118° C.

EXAMPLE 35

Preparation of dl-1-p-methoxyphenyl-1,2,3,4-tetrahydroisoquinoline hydrochloride Using essentially the method of Example 8, 23.56 g. (0.0924 mole) of N-phenethyl-p-methoxybenzamide was converted to 11.96 g. (47%) of product, M.P. 227°–237° C.

EXAMPLE 36

Preparation of dl-1-p-methoxyphenyl-2-phenethyl-1,2,3,4-tetrahydroisoquinoline hydrochloride By the method of Example 31, 11.03 g. (0.040 mole) of dl-1-p-methoxyphenyl-2-phenethyl-1,2,3,4 - tetrahydroisoquinoline hydrochloride was reacted to give 6.44 g. (42%) of tertiary-amine hydrochloride M.P. 229°–235° C.

EXAMPLE 37

Preparation of dl,dl-1-phenyl-2-(2'-phenylpropyl)-1,2,3,4-tetrahydroisoquinoline hydrochloride Using the method of Example 31, 7.36 g. (0.030 mole) of dl-1-phenyl-1,2,3,4-tetrahydroisoquinoline hydrochloride was converted to 6.37 g. (58%) of product, M.P. 204°–227.5° C.

EXAMPLE 38

Preparation of dl,dl-1-phenyl-2-(2'-phenylbutyl)-1,2,3,4-tetrahydroisoquinoline hydrochloride By the process of Example 31, 6.15 g. (0.025 mole) of dl - 1 - phenyl-1,2,3,4-tetrahydroisoquinoline hydrochloride was reacted to give 11.14 g. (83%) of product, M.P. 204°–212° C.

EXAMPLE 39

Preparation of dl-1-(p-chlorophenyl)-6-methoxy-1,2,3,4-tetrahydroisoquinoline hydrochloride By method of Example 4, 5.28 g. (0.035 mole) of m-methoxyphenethylamine and 5.63 g. (0.040 mole) of p-chlorobenzaldehyde were reacted to give 9.21 g. (85%) of product, M.P. 281.5°–283° C.

EXAMPLE 40

Preparation of dl-1-(p-chlorophenyl)-2-phenethyl-6-methoxy-1,2,3,4-tetrahydroisoquinoline hydrochloride Applying the procedure of Example 31, 4.65 g. (0.015 mole) of dl-1-p-chlorophenyl-6-methoxy-1,2,3,4-tetrahydroisoquinoline hydrochloride was converted into 5.37 g. (86%) of product, M.P. 220°–228° C.

EXAMPLE 41

Preparation of dl-1-p-hydroxyphenyl-6-methoxy-1,2,3,4-tetrahydroisoquinoline hydrochloride Using the method of Example 4, 11.32 g. (0.075 mole) of m-methoxyphenethylamine and 12.00 g. (0.10 mole) of p-hydroxybenzaldehyde were condensed to form 10.96 g. (51%) of sec.-amine hydrochloride, M.P. 265°–270° C. (decomp.).

EXAMPLE 42

Preparation of dl-1-(p-hydroxyphenyl)-2-phenethyl-6-methoxy-1,2,3,4-tetrahydroisoquinoline hydrochloride By the method of Example 31, 5.00 g. (0.017 mole) of dl-1-p-hydroxyphenyl-6-methoxy - 1,2,3,4 - tetrahydroisoquinoline hydrochloride was converted in 82% yield to product, M.P. 239°–243° C.

EXAMPLE 43

Preparation of dl-1-(p-pyrrolidinoethoxyphenyl)-2-phenethyl-6-methoxy-1,2,3,4-tetrahydroisoquinoline dihydrobromide After stirring a mixture of 3.96 g. (0.010 mole) of dl-1-p - hydroxyphenyl - 2 - phenethyl-6-methoxy-1,2,3,4-tetrahydroisoquinoline hydrochloride, 0.96 g. (0.020 mole) of 50% sodium hydride in mineral oil and 25 ml. of molecular-sieve-dried dimethylformamide for 30 minutes, 2.67 g. (0.020 mole) of N-chloroethyl pyrrolidine was added. The mixture stood overnight then was poured into ethyl acetate and washed with aqueous sodium bicarbonate. Extraction with 1 N hydrochloric acid, followed by alkalization gave an oily product that was extracted into chloroform. After drying over sodium sulfate, the solution was concentrated under vacuum. Upon dissolving the residue in ethanol, the resulting solution was saturated with hydrogen bromide. Cooling gave a precipitate that was recrystallized from ethanol-hydrogen bromide to give 2.13 g. (35%) of crystalline dihydrobromide, M.P. 231°–236° C.

EXAMPLE 44

Preparation of dl-1-phenyl-2-phenethyl-6,7-dimethoxy-1,2,3,4-tetrahydroisoquinoline hydrochloride By the method of Example 2, 0.92 g. (0.003 mole) of dl - 1-phenyl-6,7-dimethoxy-1,2,3,4-tetrahydroisoquinoline hydrochloride [Yamada et al., Chem. Pharm. Bull. 12, 249 (1964)] was converted to 0.21 g. (17%) of product, M.P. 201°–203° C.

EXAMPLE 45

Preparation of dl - 1-(p-piperidinoethoxyphenyl)-2-phenethyl-1,2,3,4-tetrahydroisoquinoline dihydrobromide By the method of Example 43, 3.96 g. (0.010 mole) of the 1-p-hydroxyphenyl compound was reacted with 2.94 g. (0.020 mole) of N-chloroethylpiperadine to yield the desired product as the dihydrobromide.

EXAMPLE 46

Preparation of dl - 1 - (p - diethylaminoethoxyphenyl)-2-phenethyl - 6-hydroxy-1,2,3,4-tetrahydroisoquinoline dihydrobromide By using the method of Example 43, the intermediate compound was reacted with N,N-diethyl-2-chloroethylamine to yield after workup the desired product.

EXAMPLE 47

Preparation of *dl* - 1 - (p-morpholinoethoxyphenyl)-2-(2'-phenylpropyl) - 7 - nitro-1,2,3,4-tetrahydroisoquinoline dihydrobromide By the method of Example 43, the intermediate compound was reacted with N-chloroethylmorpholine to yield the desired product.

We claim:
1. A compound selected from the group consisting of those of the formula:

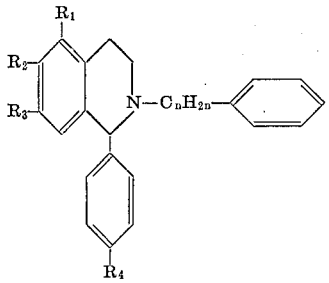

wherein $n$ has a value selected from the group consisting of 2, 3 and 4; $R_1$, $R_2$ and $R_3$ are each individually selected from the group consisting of hydrogen, hydroxy, methyl and methoxy with the proviso that at least one of $R_1$, $R_2$ and $R_3$ is hydrogen; and $R_4$ is selected from the group consisting of hydrogen, halogen, hydroxy, lower alkoxy, pyrrolidinoethoxy, diethylaminoethoxy, piperidinoethoxy and morpholinoethoxy; and the non-toxic pharmaceutically acceptable acid-addition salts thereof.

2. The compound according to claim 1 wherein $$C_6H_5-C_nH_{2n}-$$

is phenethyl; and $R_1$, $R_2$, $R_3$ and $R_4$ are each hydrogen.

3. The compound according to claim 1 wherein $$C_6H_5-C_nH_{2n}-$$

is 3-phenylpropyl; and $R_1$, $R_2$, $R_3$ and $R_4$ are each hydrogen.

4. The compound according to claim 1 wherein $$C_6H_5-C_nH_{2n}-$$

is phenethyl; $R_2$ is methoxy; and $R_1$, $R_3$ and $R_4$ are each hydrogen.

5. The compound according to claim 1 wherein $$C_6H_5-C_nH_{2n}-$$

is phenethyl; $R_1$ is methoxy; and $R_2$, $R_3$ and $R_4$ are each hydrogen.

6. The compound according to claim 1 wherein $$C_6H_5-C_nH_{2n}-$$

is phenethyl; $R_4$ is chloro; and $R_1$, $R_2$ and $R_3$ are each hydrogen.

7. The compound according to claim 1 wherein $$C_6H_5-C_nH_{2n}-$$

is 3-phenylpropyl; $R_2$ is methoxy; and $R_1$, $R_3$ and $R_4$ are each hydrogen.

8. The compound according to claim 1 wherein $$C_6H_5-C_nH_{2n}-$$

is phenethyl; $R_4$ is fluoro; and $R_1$, $R_2$ and $R_3$ are each hydrogen.

9. The compound according to claim 1 wherein $$C_6H_5-C_nH_{2n}-$$

is phenethyl; $R_2$ is methoxy; $R_4$ is pyrrolidinoethoxy; and $R_1$ and $R_3$ are each hydrogen.

10. The compound according to claim 1 wherein $$C_6H_5-C_nH_{2n}-$$

is 2-phenylpropyl; and $R_1$, $R_2$, $R_3$ and $R_4$ are each hydrogen.

References Cited
UNITED STATES PATENTS 3,435,040  3/1969  Hardtmann _____ 260—288
3,747,104  10/1969  Ott _____ 260—288X DONALD G. DAUS, Primary Examiner U.S. Cl. X.R.

260—2477R, 283R, 286R, 287R, 289R, 294R, 3268, 558R, 558A; 424—248, 258